United States Patent Office 2,950,169
Patented Aug. 23, 1960

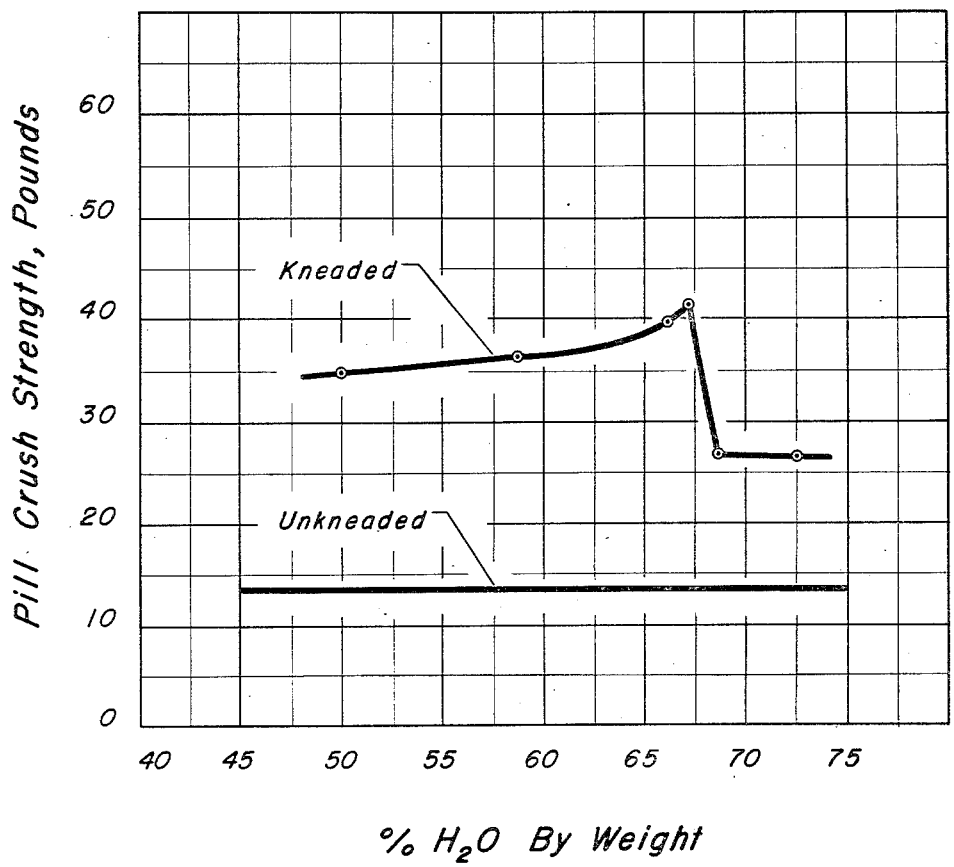

2,950,169
PROCESS FOR PREPARING SHAPED ALUMINA PARTICLES OF HIGH CRUSHING STRENGTH

Maurice J. Murray, Palatine, and Lester G. Massey, Chicago, Ill., assignors, by mesne assignments, to Universal Oil Products Company, Des Plaines, Ill., a corporation of Delaware Filed Apr. 23, 1956, Ser. No. 579,880
4 Claims. (Cl. 23—143)

This invention relates to the manufacture of alumina-containing particles of uniform size and shape. It more specifically relates to a method of preparing alumina-containing pills of high crushing strength by carefully kneading and drying the alumina before the alumina is formed into pills.

Alumina, either as the hydrate or as the anhydrous form of aluminum oxide, is widely used in the petroleum industry and many other branches of chemical industry. It has been employed in the petroleum industry as a catalyst for hydrocarbon conversion processes, as a support for catalytically active materials to be used in hydrocarbon conversion processes and as a dehydrating agent. It is widely used in other fields of chemical industry for the same and other purposes. The activated forms which are considered to be merely modifications of aluminum oxide and its hydrates are especially known for their pronounced catalytic activity and adsorptive capacity. The use of alumina as a refractory is also well known. Alumina in the form of corundum has been found suitable for use in the manufacture of certain types of refractory and ceramic materials. High purity alumina is also used medicinally. In other uses alumina is mixed or blended with other components to produce substances of modified properties. For many of these uses of alumina and alumina-containing composites, it is preferred that the alumina be in particles of uniform size and shape, that is, as cylindrical pills, spheres, polyhedra, tubular cylindrical pills, etc. Pellets or pills of uniform size and shape are preferred since the material may be more easily handled and vessels or reactors may be more readily loaded. When the alumina-containing particles are used as components in catalysts, it has been found that, when the particles are present as pills of uniform size and shape, the pressure drop through the reactors is less than when a powdered type of catalyst is used.

It is necessary, however, that the shaped alumina-containing particles possess sufficient crushing strength so that the attrition losses of the particles are reduced and the beds of the alumina-containing particles may be built up to a sufficient height without crushing the bottom particles. It is also important that the alumina-containing particles possess high crushing strength since these particles in gasoline reforming processes are often combined with rare metals such as platinum, and if the particles remain intact throughout the conversion process this greatly aids in the reclaiming of the precious metal from the catalyst mass.

It is an object of this invention to provide a new process for the production of alumina-containing pills of high crushing strength.

Alumina or aluminum hydrate is present in various modifications. Closely following the classification of H. B. Weiser and W. O. Milligan, as recorded in J. Phys. Chem. 38, 1175–82 (1934), the more common types of alumina are as follows:

Alpha alumina, often known as corundum, is the form stable at temperatures over about 950° C.

Gamma alumina is very stable but changes to alpha alumina at temperatures above about 950° C.

Gamma-$Al_2O_3 \cdot 3H_2O$ or gibbsite is prepared by aging boehmite in a cold basic solution.

Alpha-$Al_2O_3 \cdot 3H_2O$ or bayerite is also formed by aging boehmite in a cold basic solution but is unstable and gradually is transformed into gibbsite.

Gamma-$Al_2O_3 \cdot H_2O$ or boehmite may be prepared in a variety of ways, one of the simplest being to add ammonium hydroxide to a water solution of aluminum chloride. The material originally precipitated is thought to be an amorphous alumina flock which rapidly grows in crystal size yielding crystalline boehmite.

Alpha-$Al_2O_3 \cdot H_2O$ or diaspore occurs abundantly in nature.

The gamma modifications of alumina are usually preferred as the type of alumina to be used in catalyst manufacture and the method of this invention will be particularly directed to gamma alumina either in the anhydrous form or as one or more of the hydrated forms as will be hereinafter discussed.

In one embodiment the present invention relates to a method of manufacturing shaped alumina-containing pills which comprises preparing alumina by reacting aluminum with $H_2O$, kneading and drying said alumina and subsequently forming the alumina into particles of uniform size and shape.

In another embodiment the present invention relates to a method of manufacturing shaped alumina-containing pills which comprises preparing alumina by reacting aluminum with water, kneading the resultant alumina, drying and grinding the kneaded alumina and subsequently forming the ground alumina into particles of uniform size and shape.

In a specific embodiment the present invention relates to a method of manufacturing shaped alumina-containing pills which comprises preparing alumina by reacting aluminum with water, filtering the resultant alumina to remove excess water, kneading the wet alumina filter cake under drying conditions until the water content of the alumina is within the range of from about 52.5% to about 68.5% by weight, further drying the kneaded alumina, grinding the dried alumina and pelleting the dried composite to form pills of uniform size and shape.

The alumina for the present invention is prepared by reacting aluminum with water. The reaction may be effected in the presence of a catalyst such as mercury, aliphatic amines and others. The alumina, however, must be formed by reacting metallic aluminum with water. When the process of the present invention is practiced on other forms of alumina, for example, alumina prepared by adding ammonium hydroxide to an aqueous solution of aluminum chloride, the crushing strength of the pellets prepared therefrom does not necessarily increase. The alumina for use in the present invention further is preferably a slurry of alumina in which the alumina in water suspension is present as crystals. When reacting the aluminum with water, it is preferred to maintain the temperature below about 400° F. When preparing alumina at temperatures above about 400° F., the alumina is usually produced as boehmite, and at temperatures below about 400° F. the alumina is usually produced as gibbsite. Since the alumina is produced in an aqueous medium, the lower temperature limit at which the alumina is formed is the freezing point of the solution which is usually about 32° F.

The conventional manner of making alumina pellets after the alumina is formed is to filter, dry, grind and finally form the ground material into particles of uniform size and shape in any suitable pelleting, extrusion, etc. apparatus. We have discovered, however, that when the wet filter cake is kneaded prior to complete drying and grinding, that the resultant alumina pellets are much higher in crushing strength. According to our invention, therefore, the alumina formed by reacting aluminum with water is passed to a filter which removes the excess water and the alumina is recovered from the filter as a wet filter cake. The wet filter cake at this point of operation usually contains from about 70% to about 85% by weight of water.

In accordance with our invention the wet alumina filter cake is kneaded. In the kneading operation the alumina is pressed against the walls of the container and against contiguous material. This pressure tends to force out water between the alumina particles and, therefore, it displaces the water which has been present. The kneading action also causes shear which brings a new relationship to the particles of the alumina.

The kneading may be performed in any suitable type of apparatus. A pan mixer, sometimes known as a putty chaser, edge runner, or muller mixer is suitable. A Simpson type muller is a machine that is commercially available which is especially suited to the process of the present invention.

In the kneading operation, as hereinbefore mentioned, water is forced from alumina particles. During the mulling operation, the granular wet solids are converted to a thick slurry since water is released from the alumina particles by the kneading operation. It is preferred that the kneading be performed at drying conditions so that the excess water is evaporated from the alumina slurry. The drying atmosphere may be provided by passing a dry gas over the alumina slurry or by heating the alumina slurry in an unsaturated atmosphere. The extended kneading and preliminary drying is a factor which greatly influences the final strength of the alumina pellets. It is preferred that the kneading and preliminary drying are continued until the water content of the alumina is less than 68.5% by weight water. It is particularly preferred that the water content of the alumina slurry after the kneading operation be within the range of from about 52.5% to about 68.5% by weight since alumina pellets prepared from the alumina slurry which has been kneaded and preliminarily dried to water concentrations within this range resulted in alumina pellets of much higher crushing strength. The preliminary drying conditions in which the kenading operation is performed are generally not severe and in fact the drying conditions should be such that at least one minute and preferably at least two minutes of the mulling operation is performed on the alumina before the water content of the alumina slurry falls below 68.5% by weight water.

After the kneading and preliminary drying operation the alumina slurry is further dried at more severe drying conditions. This drying is for a time and to a degree to reduce the water content of the alumina to a concentration where the alumina may be ground to a powder. Generally the water concentration is below about 30% by weight. This drying of the alumina slurry after kneading may be performed in any conventional manner such as by passing hot dry gases over the alumina slurry while mixing it, by placing the alumina slurry in pans in a hot oven, etc. After the drying operation the alumina which now contains less than 30% water by weight is ground and a suitable lubricant such as stearic acid, rosin, hydrogenated coconut oil, graphite, etc. is added. The composite is then formed into pills of suitable size and shape by any suitable pelleting means. Particularly satisfactory particles comprise cylindrical pills of the size ranging from about 1/16" x 1/16" to 1/4" x 1/4" or thereabout. Pellets of uniform size and shape may also be formed by extrusion or other suitable methods applied to the alumina at an appropriate stage of its processing. For example, the alumina may be extruded immediately after the kneading and preliminary drying operation.

Alumina in many of its uses, especially as a component of a catalyst, for example, as a component of an alumina-platinum catalyst to be used in a gasoline reforming operation, is subjected to high temperatures, that is, temperatures in excess of 600° F. In preparing the platinum-alumina catalyst, the final alumina is preferably calcined at a temperature of from about 750° F. to about 1500° F. before compositing with the platinum.

The following examples are introduced to further illustrate the novelty and utility of the present invention but not with the intention of unduly limiting the same. The examples illustrate how the kneading operation greatly increases the crushing strength of the final alumina pellet.

EXAMPLE I 1800 grams of aluminum pellets of approximately 1/2 inch average diameter and 99.9% purity and 8.0 grams of metallic mercury were placed in a rotating reactor with the axis of rotation substantially horizontal. The reactor was rotated at 10 r.p.m. Water was introduced into the reactor and a reaction between aluminum and water progressed to form alumina. The reaction temperature was maintained at about 200° F. A small stream of water was continuously introduced to the reaction zone and an exit stream of an alumina slurry was withdrawn from the reaction zone. The resultant alumina slurry was filtered in a Büchner funnel. The resulting filter cake was divided into approximately equal portions. One-half of the alumina filter cake was placed in a pan mixer of the type illustrated on page 1559 of the Chemical Engineer's Handbook published by Mc-Graw-Hill Book Company, second edition, 1941. An infra-red heat lamp was directed on the slurry in the mixer and the alumina was kneaded at these conditions until the alumina had a water content of approximately 56% by weight. The alumina was then removed from the pan mixer and dried at 460° F. for 5 hours, ground, formed into 1/8" x 1/8" cylindrical pills and calcined at 1200° F. for 3 hours. These pills had a pill crushing strength of approximately 32.5 pounds.

The other half of the alumina filter cake was also dried at 460° F. for 5 hours, ground to a powder, pelleted to form 1/8" x 1/8" cylindrical pills and calcined for 3 hours at 1200° F. Therefore, the only difference between the treatment of the two halves of the filter cake is that one was kneaded under drying conditions before the final drying step. While the kneaded material formed 1/8" x 1/8" cylindrical pellets having a pill crushing strength of 32.5 pounds, the unkneaded material had a pill crushing strength of only 13.4 pounds. As a result of a kneading operation, therefore, the pill crushing strength was increased by a factor of almost 2 1/2.

EXAMPLE II

An alumina filter cake prepared as above in Example I was loaded into a pan mixer. An infra-red bulb was again directed on the alumina filter cake in the pan mixer. The kneading operation was started and at various intervals during the kneading, samples of the alumina were withdrawn. Each sample was dried for 5 hours at 460° F., ground to a fine powder and pilled in a Stokes pelleting machine. The pills were then tested for pill crushing strength. Each alumina sample as it was withdrawn from the pan mixer was analyzed for the weight percent of water. The water contents and the pill crushing strengths are tabulated below.

*Table*

| Time of Kneading in Hours | Wt. Percent Water in Alumina Sample | 1/8" Pill Crushing Strength |
| --- | --- | --- |
| 0.25 | 72.5 | 26.5 |
| 2.00 | 68.7 | 26.7 |
| 2.50 | 67.0 | 41.3 |
| 3.10 | 66.1 | 39.9 |
| 3.25 | | 37.9 |
| 3.55 | 58.7 | 36.3 |
| 3.65 | 53.9 | |
| 4.10 | 50.0 | 34.7 |

From the above table it may be seen that after the water content is reduced below about 68.5% by weight that the pill crushing strength increases rapidly. The table above also shows that the effect of kneading at all water concentrations is to produce pellets of greater strength than those produced without kneading.

The accompanying figure illustrates graphically not only the improvement in crushing strength effected by the kneading step of the present process, but also the criticality of sufficient drying during the kneading step. Referring to the figure, the ordinate represents the crushing strength of a 1/8" x 1/8" cylindrical pill of alumina and the abcissa represents the percent of water by weight in the alumina.

The lower line on this plot shows that without kneading, no matter how the alumina is dried the ultimate pill crushing strength is 13.4 pounds. The upper line indicates that any kneading under drying conditions effects improvement in the pill crushing strength, increasing it at least to 26.5 pounds. The upper line further illustrates that a critical drying point exists where unexpectedly superior results occur and this point is at about 68% water by weight. It is understood that alumina prepared by modified processes may result in a product having a different critical preliminary drying point and these aluminas are intended to be within the broad scope of this invention.

We claim as our invention:

1. A method for manufacturing shaped alumina-containing pills of high crushing strength from an alumina resulting from the reaction of $H_2O$ with aluminum and having a water content of from about 70% to about 85% by weight, which comprises filtering the alumina from the reaction mixture, kneading said alumina for at least 2 hours while drying until the water content of the alumina is reduced to an amount between about 52.5% and about 68.5% by weight, then further drying the alumina sufficiently to reduce its water content to below about 30% by weight, thereafter forming the thus kneaded and dried alumina into particles of uniform size and shape, and calcining said particles.

2. A method for preparing shaped alumina-containing pills which comprises reacting aluminum with $H_2O$, filtering the resultant reaction mixture to separate therefrom an alumina having a water content of from about 70% to about 85% by weight, kneading the filtered wet alumina for at least 2 hours at drying conditions, further drying the kneaded alumina, grinding the dried alumina and forming the ground alumina into particles of uniform size and shape.

3. A method for preparing shaped alumina-containing pills which comprises reacting aluminum with $H_2O$, filtering the resultant reaction mixture to separate therefrom an alumina having a water content of from about 70% to about 85% by weight, simultaneously kneading and drying the filtered wet alumina for a sufficient time to reduce the water content of the alumina to below about 68.5% by weight, further drying the kneaded alumina, grinding the dried alumina and forming the ground alumina into particles of uniform size and shape.

4. A method for preparing shaped alumina-containing pills which comprises reacting aluminum with $H_2O$, filtering the resultant reaction mixture to separate therefrom an alumina having a water content of from about 70% to about 85% by weight, simultaneously kneading and drying the filtered wet alumina for a sufficient time to reduce the water content of the alumina to between about 52.5% and about 68.5% by weight, then further drying the alumina sufficiently to reduce its water content to below about 30% by weight, thereafter forming the thus kneaded and dried alumina into particles of uniform size and shape, and calcining said particles.

References Cited in the file of this patent

UNITED STATES PATENTS

| | | |
|---|---|---|
| 2,232,145 | Schoeld | Feb. 18, 1941 |
| 2,406,420 | Weiser et al. | Aug. 27, 1946 |
| 2,635,950 | Robinson | Apr. 21, 1953 |
| 2,758,011 | Bloch | Aug. 7, 1956 |
| 2,847,387 | Smith | Aug. 12, 1958 |
| 2,858,280 | Maitha | Oct. 28, 1958 |